Oct. 20, 1953  J. T. PENNINGTON  2,655,834
REFLECTING PROJECTOR WITH AUTOMATIC FOCUS MECHANISM
Filed Aug. 27, 1952  5 Sheets-Sheet 1

INVENTOR.
John T. Pennington
BY
ATTORNEYS

Oct. 20, 1953  J. T. PENNINGTON  2,655,834
REFLECTING PROJECTOR WITH AUTOMATIC FOCUS MECHANISM
Filed Aug. 27, 1952  5 Sheets-Sheet 2

INVENTOR.
John T. Pennington

Oct. 20, 1953     J. T. PENNINGTON     2,655,834
REFLECTING PROJECTOR WITH AUTOMATIC FOCUS MECHANISM
Filed Aug. 27, 1952     5 Sheets-Sheet 3

INVENTOR.
John T. Pennington
BY
ATTORNEYS

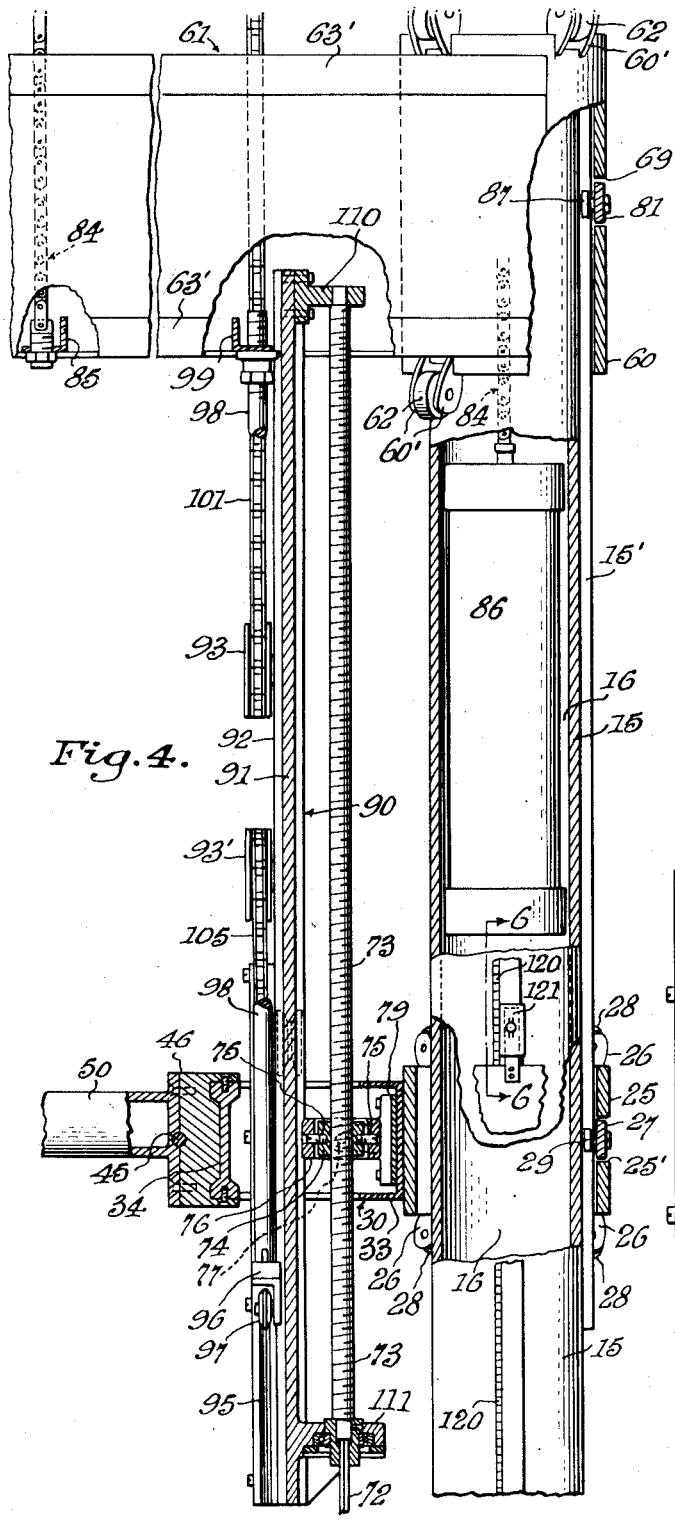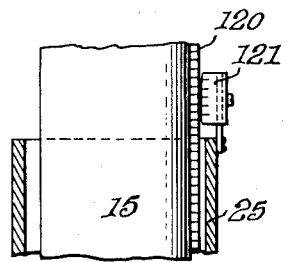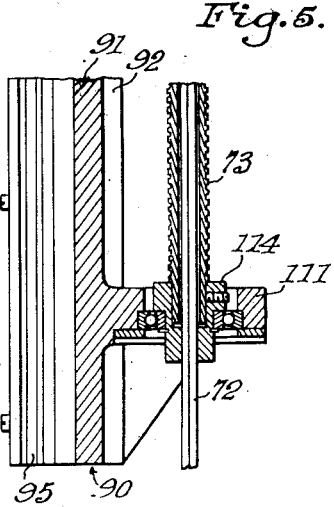

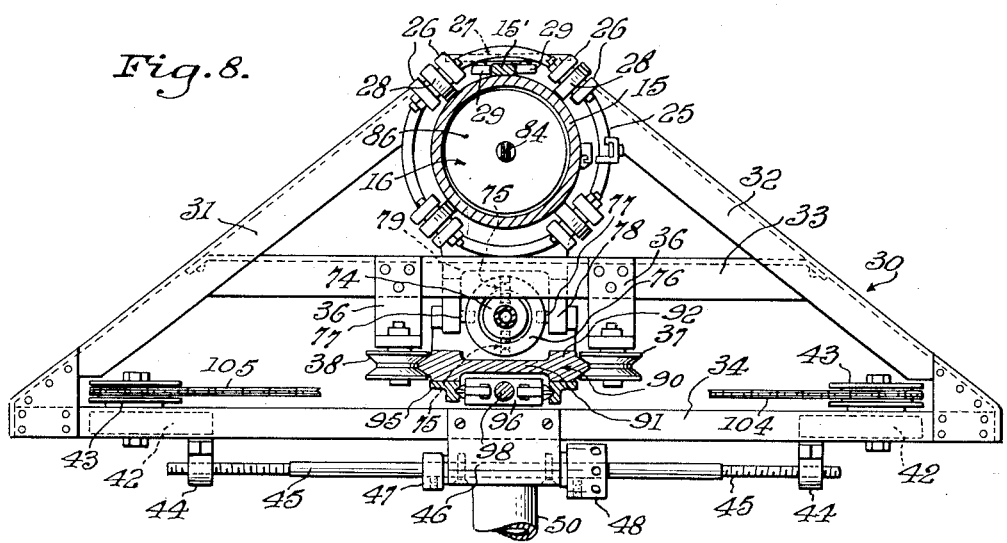
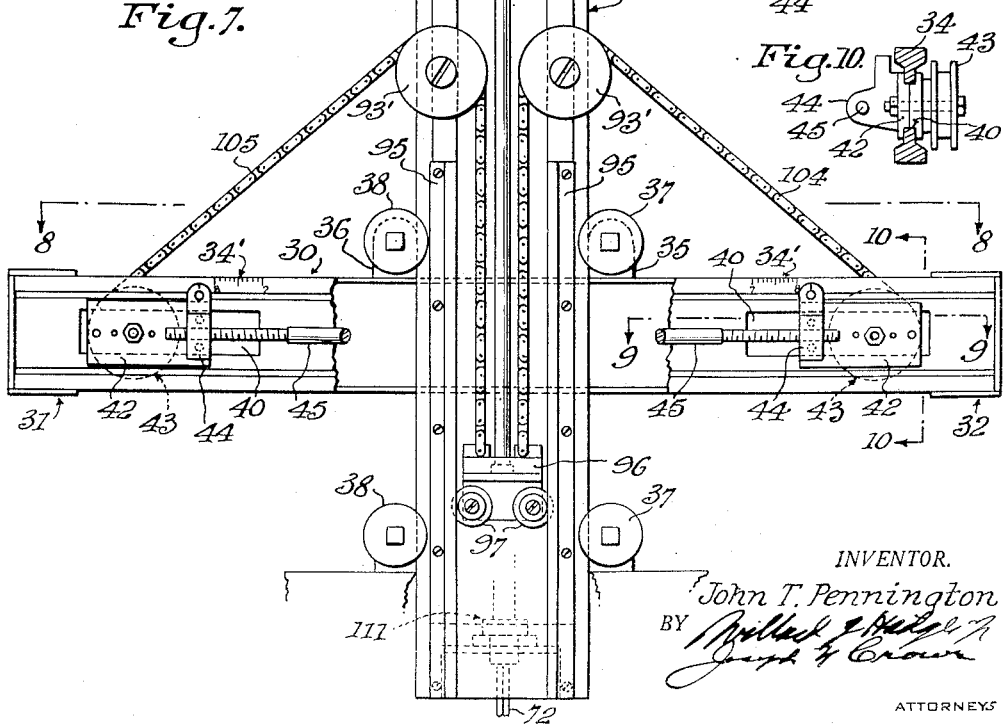

Patented Oct. 20, 1953

2,655,834

UNITED STATES PATENT OFFICE 2,655,834

REFLECTING PROJECTOR WITH AUTOMATIC FOCUS MECHANISM

John T. Pennington, Alexandria, Va.

Application August 27, 1952, Serial No. 306,741

9 Claims. (Cl. 88—24)

(Granted under Title 35, U. S. Code (1952), sec. 266)

The invention described herein may be manufactured and used by or for the Government for governmental purposes, without payment to me of any royalty thereon.

This invention relates to equipment for the projection of enlarged photographic images, and more particularly to a reflector type projector having an automatic focusing mechanism whereby any desired enlargement or reduction of the representation projected may be obtained with accompanying automatic focusing of the related mechanism.

Although the embodiment of the invention herein described is a projector, its applicability in the art of photographic enlargement is apparent.

In order that the projection of the image of an object through a lens be properly focused, it is well known that the basic lens equation $$\frac{1}{A}+\frac{1}{B}=\frac{1}{f}$$

must be satisfied. In the equation, $A$ is the lens-object distance, $B$ the lens-image distance, and $f$ is the focal length of the lens.

In projecting apparatus, a change in the position of either the lens or object plane requires a shift in the other of a magnitude and direction sufficient to maintain the apparatus in focus. Heretofore, such positioning and the initial setting of the components has been determined conventionally through trial and error or prepared tables. In order to reduce the time required, the present invention contemplates the provision of mechanical linkage between the portions of the apparatus carrying the lens, the object, and the image planes such that the basic lens equation referred to above is always satisfied.

Accordingly, it is an object of the present invention to provide projecting apparatus adapted for either manual or power drive in which the elements are constantly maintained in such relationship that the basic lens equation holds true therefor.

A further object of the invention is the provision of a rugged projector adapted for work demanding a high degree of accuracy and embodying automatic forcusing mechanism which operates simultaneously with the positioning of the lens of the projector to constantly produce a focused image of the representation projected.

Another object of the invention is the provision of rugged, simplified, mechanical elements adapted to simultaneously solve the basic lens equation.

These and other objects of the invention will become apparent from the following description, in conjunction with the accompanying drawings, in which:

Fig. 4 is an enlarged section on the line 4—4 of Fig. 1, omitting the projector, lens mounting, and table;

Fig. 5 is an enlarged fragmentary section of a portion of Fig. 4;

Fig. 6 is a section on the line 6—6 of Fig. 4 showing the details of the vernier;

Fig. 7 is an enlarged front elevation of the lens frame assembly with the lower portion of the floating member;

Fig. 8 is a section on the line 8—8 of Fig. 7;

Fig. 9 is a fragmentary detail taken on the line 9—9 of Fig. 7;

Fig. 10 is a section on the line 10—10 of Fig. 7; and

Figure 1:
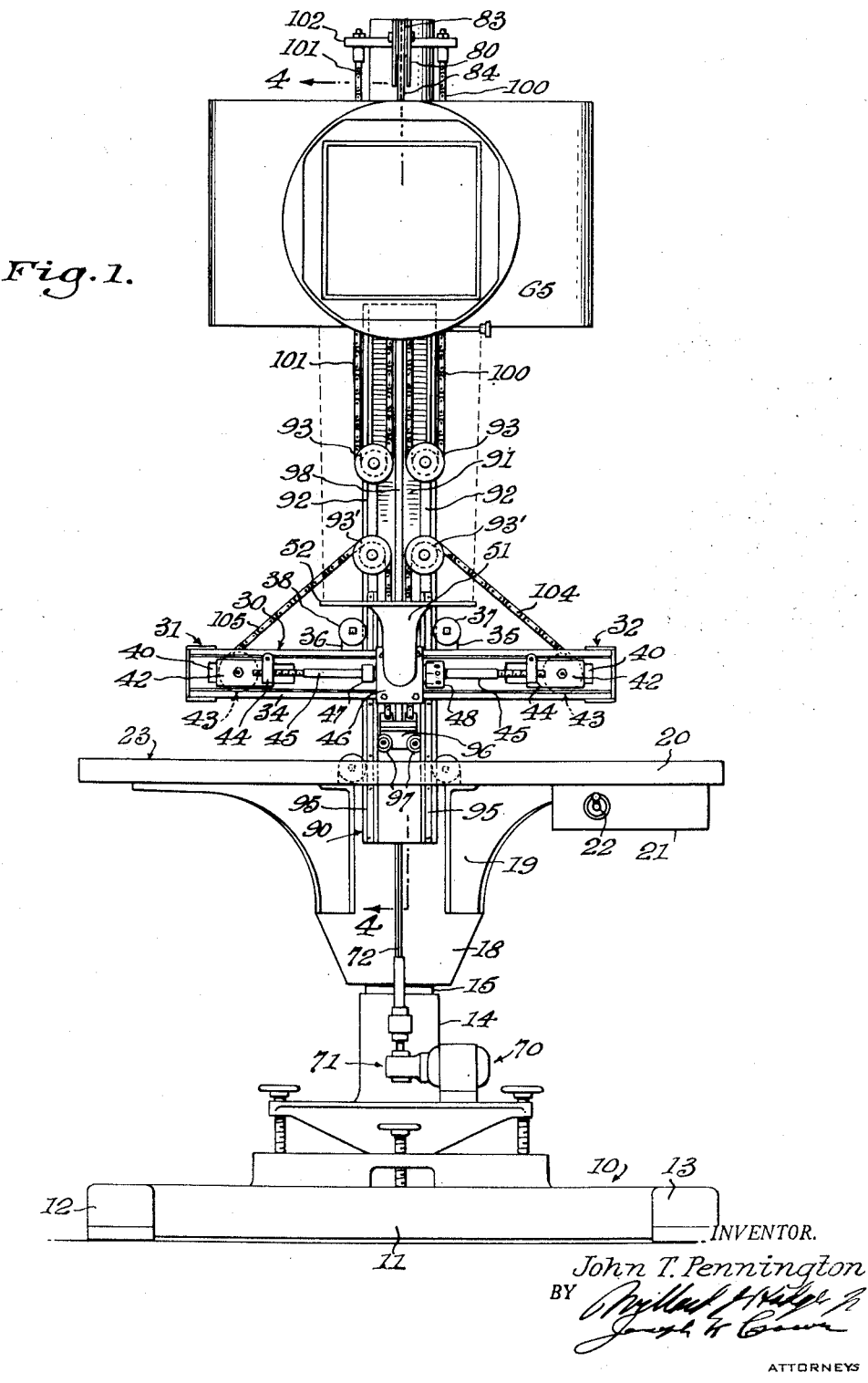
Fig. 1 is a front elevation of a projector illustrating an embodiment of the invention.
Figure 2:
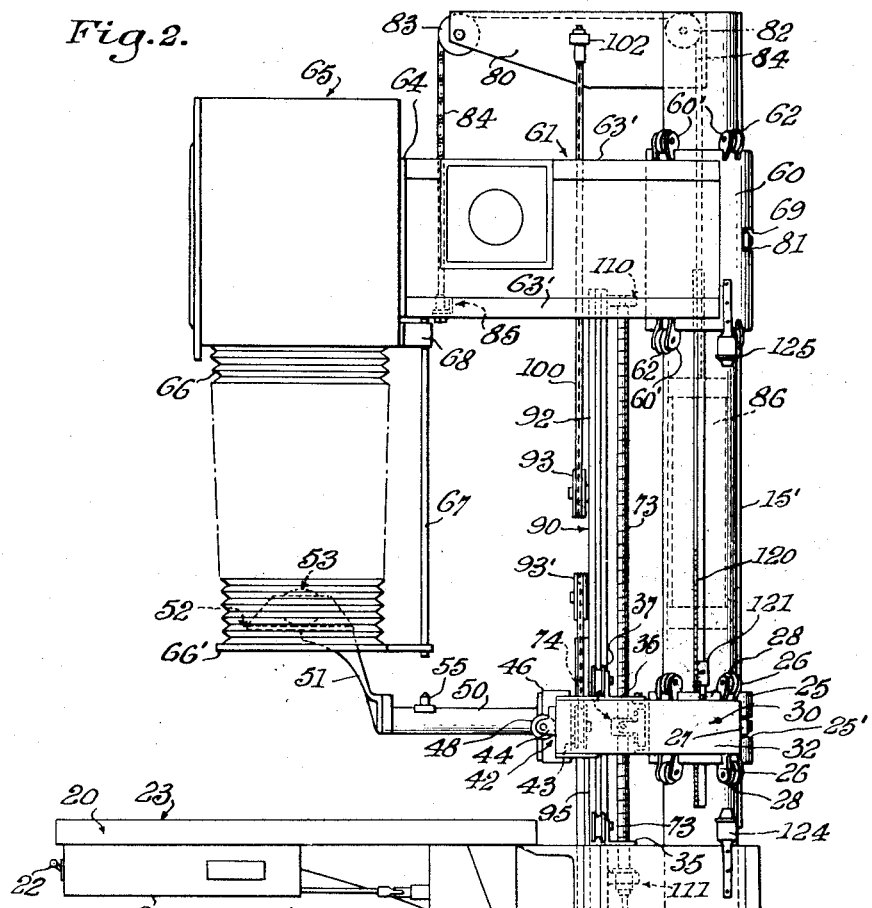
Fig. 2 is a side elevation of the structure of Fig. 1.
Figure 11:
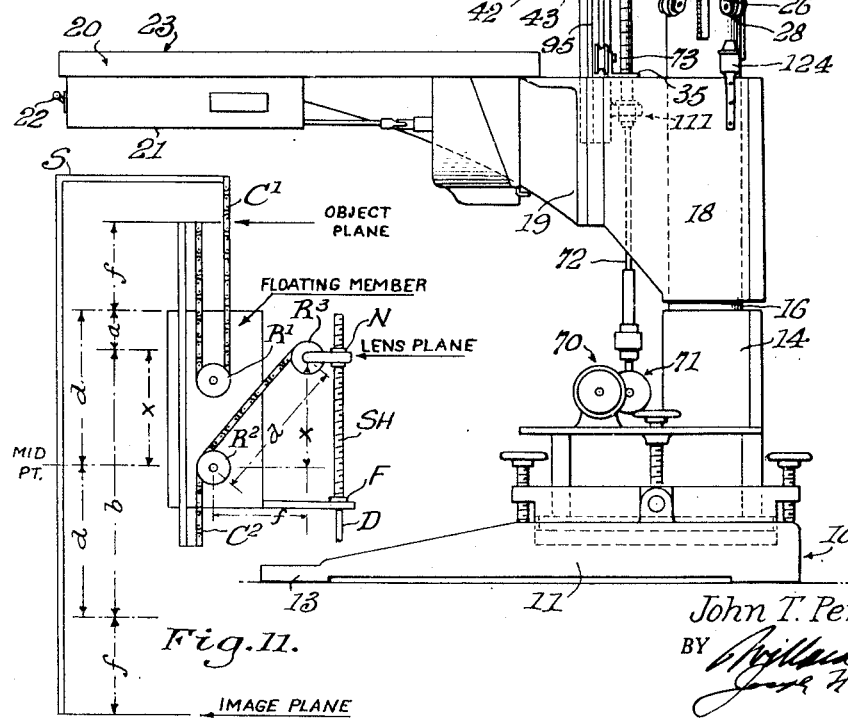
Fig. 11 is a schematic diagram illustrating the application of the basic lens equation to the structure disclosed.

Reference is first made to Fig. 11 which is a simplified diagram of the arrangement of certain elements of the improved apparatus, in which the Object Plane, Lens Plane and Image Plane are labeled accordingly for ready reference. In the present structure, the image plane normally remains fixed, the lens and object planes being movable in relation thereto and to each other. In the schematic diagram of Fig. 11, a fixed support S has a chain or an equivalent flexible cable, designated C1, suspended from an overhanging arm thereof, the chain passing down around a roller R1 and having its other end connected to the object plane. Attached to the object plane next to the chain C1 is a rod which extends down and is connected at its other end to a chain or equivalent flexible cable, indicated as C2, which passes over a roller R2 and is connected to a third roller R3. The rollers R1 and R2 are mounted on a floating member and the roller R3 is attached to the lens plane. A drive shaft Sh is in threaded engagement with a nut N in fixed relation to the lens plane and is received in a fitting F which is in fixed relation to the floating member. A drive member D extends into and engages the shaft Sh in order that the shaft may be rotated at will. The drive member D is preferably power operated, although it may be operated manually if desired.

As stated above, the basic lens equation is $$\frac{1}{A}+\frac{1}{B}=\frac{1}{f}$$

in Fig. 11, by construction, $A=f+a$ and $B=f+b$. Substituting in the equation then $$\frac{1}{a+f}+\frac{1}{b+f}=\frac{1}{f}$$

and $$bf+f^2++af_\neg \cdot f^2=ab+fb+af+f^2$$
$$f^2=ab$$

hence, the basic lens equation holds true when:

$$f^2=ab$$

By construction (Fig. 11):

$$f^2=d^2-x^2$$
$$a=d-x$$
$$b=d+x$$

hence:

$$f^2=ab$$

The construction to be described embodies the elements and relationship described above in order that the lens equation may be met at all times.

Referring to the other figures of the drawing, the projector comprises a base 10 having a body 11 and feet 12 and 13. Extending upwardly from the base is a sleeve 14 having leveling means engaging the base. Mounted in the sleeve is an upstanding column 15, having a bore 16.

Mounted on the column 15 just above the sleeve 14 is another sleeve 18 having a bracket 19 attached thereto for supporting a table 20. On the under side of the table 20, a control box 21 is carried having various operating means 22. The table has a flat upper surface 23 on which a sheet of paper or the like may be positioned to receive the projected image, corresponding to the image plane in Fig. 11. Positioned above the sleeve 18 is a movably mounted sleeve or ring member 25 carrying a plurality of spaced lugs 26, between which rollers 28 are mounted, the rollers engaging the column 15.

Attached to the sleeve 25 is an extended frame 30. The frame has angularly disposed arms 31 and 32 which are connected by parallel spaced struts 33 and 34, each strut forming a triangle with the arms 31 and 32. On the upper surface of the strut 33, brackets 35 and 36 are mounted in spaced relation for carrying guide rollers 37 and 38 for a purpose to be described later.

Each end portion of the strut 34 has a guide slot 40 in which a slide 42 is mounted. The rear portion of the slide carries a sheave 43, and the front portion a lug 44 for threadably engaging a shaft 45, the shaft having its central portion rotatably mounted in a mounting member 46 attached to the central portion of the strut 34. The strut 34 has graduations 34' for indicating the distance from reference of the slide 42 along it. Adjustable retaining members 47 and 48 are attached to the shaft on either side of the support member 46 in order to fix the axial position of the shaft relative to the support member 46. Knob member 48 is used for rotating the shaft and is graduated to assist in accurately positioning the slides 42.

Extending outwardly from support member 46 and substantially parallel to the table 20 is a lens support arm 50. The lens support arm carries a bracket 51 on which is mounted a frame 52 for the lens 53. A guide member 55 extends upwardly from the arm 50 for a purpose to be described later.

Mounted above the sleeve 25 is a sleeve or ring member 60 which has a plurality of spaced lugs 60' carrying rollers 62 for holding the sleeve in spaced relation from and in rollable contact with the column 15, in the same manner as the sleeve 25. The sleeve 60 carries a projector support assembly 61 comprising angularly disposed arms 63 and 63' and a strut 64 on which the projector lamp housing assembly 65 is mounted. The projector assembly 65 houses conventional projector mechanism including a lamp, photo holder, reflecting mirror, and the like. From the under side of the housing assembly 65 a bellows 66 extends which has a frame 66' at its lower end attached to a guide rod 67 which is slidably received in a lug 68 extending from the housing assembly 65. Rod 67 has a bore (not shown) for receiving at its lower end the guide member 55 when the projector support arm is sufficiently low. The lens 53 is received in the lower portion of the bellows 66, suitable retaining means, not shown, being provided therefor.

In order to prevent rotation of the sleeves 25 and 60 on the column, and to insure longitudinal movement therealong, only, a rail or rib 15' is attached to the rear of the column and extends longitudinally from the top to just above the sleeve 18 carrying the table 20. Sleeve 25 has a rectangular slot 25' intermediately of its rear portion and transversely of the rail 15'. Across the slot 25' a bearing plate 27 is mounted carrying spaced rollers 29 for engagement with the sides of rail 15'. Similarly, sleeve 60 has a slot 69 with transverse bearing plate 81 mounting rollers 87 for engagement with rail 15'.

In order to move the elements of the projector relative to each other, a drive is provided including a reversible motor 70 connected through suitable gearing 71 to a drive shaft 72. The drive shaft 72 is preferably of a square or other non-circular cross section in order that it may engage the hub of thrust bearing 114 carrying the lower end of drive screw 73 which receives the shaft 72. In order to move the sleeve 25 carrying the extended frame 30 to which the lens 53 is attached, a drive nut 74 is engaged with the threaded drive screw 73. The drive nut is mounted by oppositely disposed studs 75 which are pivotally carried in a floating ring 76. The ring is mounted by studs 77 between spaced arms 78 of a U-shaped member 79 which is rigidly connected to the sleeve 25. Since the drive nut 74 is restrained from rotation, rotation of the drive screw 73 will produce relative axial motion between the drive screw and the extended frame 30 carrying the lens 53.

Extending outwardly from the top of the column and over the arm 61 and extended frame 30 is an arm 80. The arm 80 is anchored to the top of the column, extending through a slot therein, and carries sheaves 82 and 83 at either end thereof, the sheave 82 being positioned with at least a portion thereof within the bore 16 of the column 15, the sheave 83 being at the other end of the arm. The sheaves 82 and 83 carry a chain 84 having one end attached to a cross bar 85 adjacent member 64 of the arm 61, and the other to a counterweight 86 suspended within the bore 16 of the column. The counterweight is provided to substantially offset or counterbalance the weight of the projector housing to reduce the load on the drive mechanism.

An elongated floating member 90 is suspended parallel to the axis of the column 15. The floating member has a substantially H-shaped section having a web 91 and thickened side portions 92. The outer edges of the side portions 92 are angularly shaped in order to engage guide rollers 37 and 38 attached to the strut 33 of the extended frame 30 and the column 15 respectively. Upper and lower pairs of spaced sheaves or rollers 93, 93' are mounted on the member 90 for purposes to be described presently. The side portions 92 of member 90 have spaced races 95 attached thereto between which a slider 96 is mounted. The slider 96 has rollers 97 on its lower side portions for engaging the races 95 and has a rod 98 attached to the upper central portion thereof whose upper end is connected to a strut 99 bridging the arms 63 and 63' of the member 61.

The member 90 is suspended from the arm 80 at the top of column 15 by chains or similar means 100 and 101 attached to a transverse bar 102, the chains extending from either end of the bar down around the upper pair of sheaves 93 on the floating member 90 and having their other ends connected to the strut 99 adjacent the rod 98.

Figure 3:
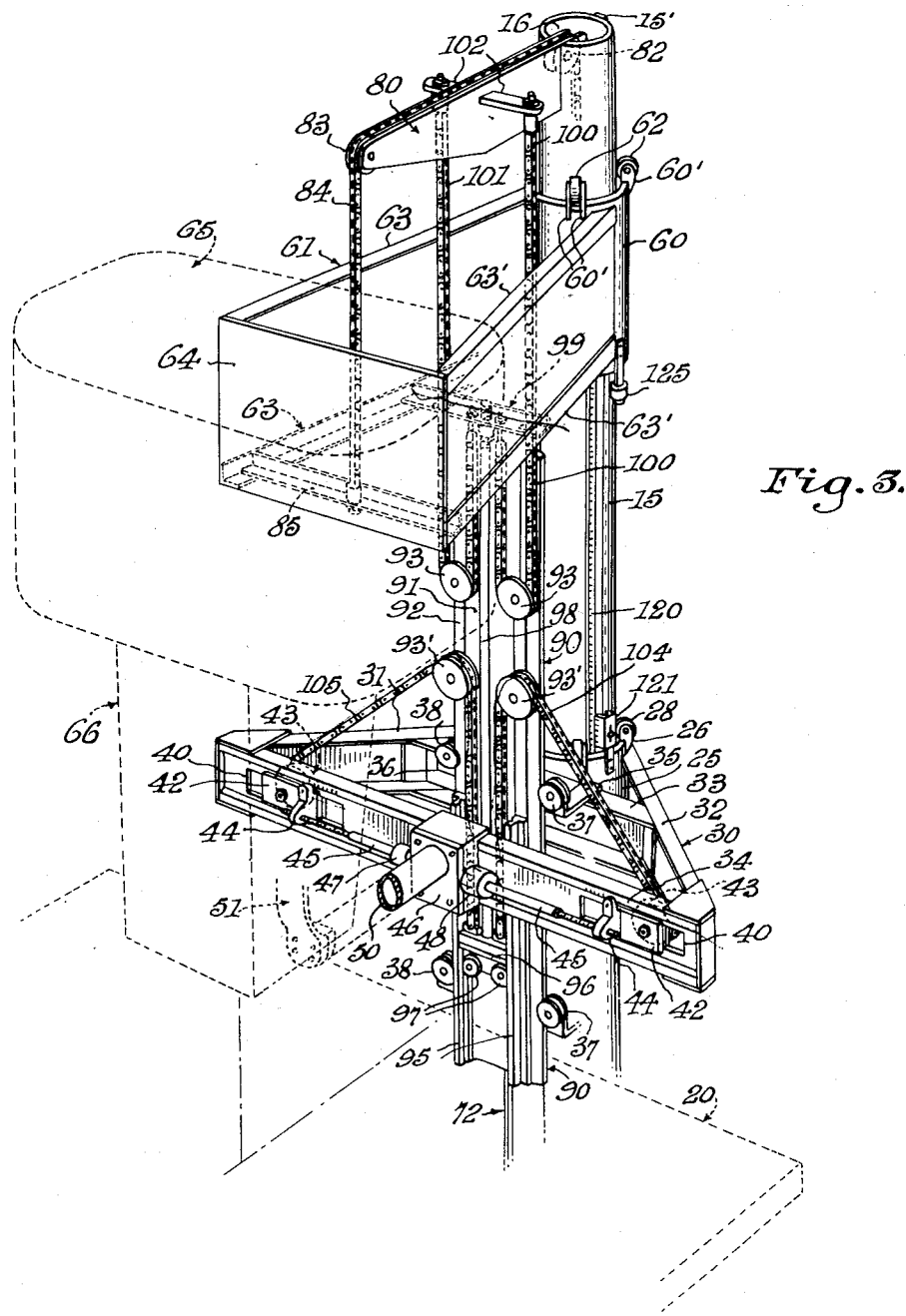
Fig. 3 is a fragmentary perspective of the upper portion of the structure of Figs. 1 and 2 with certain portions thereof shown in phantom.

Attached adjacent each side of the rod 98 on the slider member 96 are chain members 104 and 105 which extend upwardly over the lower pair of sheave members 93', and around the sheaves 43 at either end of the strut 34 of the extended arm assembly 30 to which sheaves the respective chains are connected. With particular reference to Figs. 3 and 11, it will be apparent that sheaves 93' and 43 correspond to sheaves R₂ and R₃, respectively, in the schematic drawing. The sheaves 42 are adjusted on the strut 34 a perpendicular distance from the sheave 93' corresponding to the focal length, or "f" of the lens being used. It will be understood that Fig. 11 schematically illustrates only one side of the floating member 90 and strut 34, the sides in the embodiment being symmetrical and provided for balance and ease of operation.

With particular reference to Fig. 4, adjacent the upper and lower ends of the floating member 90, and on the side thereof next to the column 15, are lugs 110 and 111. The lug 110 has a bore adapted to loosely receive the upper end of the drive screw 73. The lug 111 has a bore for receiving the thrust bearing 114 in which the drive screw 73 is mounted.

In order to assist in the accurate positioning of the lens a desired distance above the table, a scale 120 is attached to the side of column 15 for use with a vernier indicator 121 attached to the upper edge of sleeve 25.

Limit switches 124 and 125, attached to the table mounting and projector support assembly sleeves 18 and 60, respectively, are provided to automatically stop operation of the drive motor 70 when the projector support assembly reaches a predetermined proximity to the table.

In the operation of the device, the motor 70 is operated to rotate drive shaft 72 and drive screw 73. The drive nut 74 moves up or down on the drive screw, according to the direction of rotation thereof, thus moving the lens 53. The axial movement of the drive nut produces corresponding movement of the ring 25 and the extended frame 30. Movement of the frame 30 moves the sheaves 43 carrying the chains 104 and 105 which change the position of the slider 96 and hence that of the rod 98. Movement of the rod 98, which is attached to the bracket 96, similarly moves the lamp housing 65 which carries the Object Plane. Movement of the lamp housing 65 and the bracket 96 moves the sheaves 93 and 93' about which the chains 100, 101, and 104, 105, respectively, are engaged. Movement of the sheaves 93 and 93' therefore affects the position of the lamp housing 65 and the extended frame 30 carrying the lens, the movement and relationship at all times being such that the basic lens equation is at all times met.

It will be understood by those skilled in the art that the invention is not limited to the specific embodiment shown and described, but includes all reasonable equivalents and variations thereof.

Having thus described my invention, what I claim as new and wish to secure by Letters Patent is:

1. A projector comprising a base, a sleeve extending upwardly therefrom, an upstanding column having the upper portion hollow and supported on said base in said sleeve, a table mounting sleeve mounted on the column, a bracket attached to the table mounting sleeve, a table supported on the bracket at substantially right angles to the column, first and second rollably mounted sleeves mounted above the table mounting sleeve, the first being mounted above the second, an arm mounted on the first sleeve, a projector lamp housing assembly mounted on the arm, a bellows on the housing, a frame on the bellows, a lens in the bellows, a guide rod mounted on the housing and slidably engaging the frame, an extended frame mounted transversely of the column and on the second sleeve, an arm extending from the extended frame, the arm carrying the lens, a drive nut swivelly mounted on the extended frame, a drive screw engaged with the drive nut, means for driving the drive screw, said means comprising a shaft slidably mounted in the drive screw and adapted to exert torsion thereon when rotated, and power means for rotating the shaft at will, an arm extending from the top of the column, a roller mounted near the end of the arm, a roller mounted over the hollow upper portion of the column, chain means passing over the rollers, a counterweight attached to one end of the chain and vertically movable in the column, the other end of the chain being attached to the first sleeve, an elongated member floatingly mounted parallel to the column, upper and lower pairs of spaced rollers mounted on the member, a slider mounted on the member for longitudinal movement thereof, spaced upper and lower bracket members extending laterally from the elongated member and having aligned bores, the drive screw longitudinally engaging and being rotatably mounted in the bores between the bracket members, a support rod connected at one end to the arm on the first sleeve and at the other end to the slider, said rod being disposed parallel to the column, chain means extending from said arm down around each of the upper rollers and connected to the arm extending from the top of the column, a roller equidistantly and adjustably mounted on each side of the center of the transverse frame, and chain means around and connected to each roller and extending over one of the lower pair of spaced rollers on the elongated member and connected to the slider.

2. A projector comprising a base, a sleeve extending upwardly therefrom, an upstanding column having the upper portion hollow and supported on said base in said sleeve, a table mounting sleeve mounted on the column, a bracket attached to the table mounting sleeve, a table supported on the bracket at substantially right angles to the column, first and second sleeves movably mounted above the table mounting sleeve, the first being mounted above the second, an arm mounted on the first sleeve, a projector lamp housing assembly mounted on the arm, a bellows on the housing, a lens in the bellows, an extended frame mounted transversely of the column and on the second sleeve, an arm extending from the extended frame, the arm carrying the lens, a drive nut swivelly mounted on the extended frame, a drive screw engaged with the drive nut, means for driving the drive screw, said means comprising a shaft slidably mounted in the drive screw and adapted to exert torsion thereon when rotated, and power means for rotating the shaft at will, an arm extending from the top of the column, a roller mounted near the end of the arm, a roller mounted over the hollow upper portion of the column, chain means passing over the rollers, a counterweight attached to one end of the chain and vertically movable in the column, the other end of the chain being attached to the first sleeve, an elongated member floatingly mounted parallel to the column, the drive screw longitudinally engaging said elongated member, upper and lower pairs of spaced rollers mounted on the member, a slider mounted on the member for longitudinal movement thereof, a support rod connected at one end to the arm on the first sleeve and at the other end to the slider, said rod being disposed parallel to the column, chain means extending from said arm down around each of the upper rollers and connected to the arm extending from the top of the column, a roller equidistantly and adjustably mounted on each side of the center of the transverse frame, and chain means around and connected to each roller and extending over one of the lower pair of spaced rollers on the elongated member and connected to the slider.

3. A projector comprising a base, a sleeve extending upwardly therefrom, an upstanding column supported on said base in said sleeve, a table mounting sleeve mounted on the column, a bracket attached to the table mounting sleeve, a table supported on the bracket at substantially right angles to the column, first and second sleeves movably mounted above the table mounting sleeve, the first being mounted above the second, an arm mounted on the first sleeve, projector means mounted on the arm, an extended frame mounted transversely of the column and on the second sleeve, an arm extending from the extended frame, lens means carried by the arm, drive means mounted on the extended frame, means for driving the drive means, an arm extending from the top of the column, a roller mounted near the end of the arm, a roller mounted at the upper portion of the column, chain means passing over the rollers, a counterweight attached to one end of the chain, the other end of the chain being attached to the first sleeve, an elongated member floatingly mounted parallel to the column, upper and lower pairs of spaced rollers mounted on the member, a slider mounted on the member for longitudinal movement thereof, a support rod connected at one end to the arm on the first sleeve and at the other end to the slider, said rod being disposed parallel to the column, chain means extending from said arm down around each of the upper rollers and connected to the arm extending from the top of the column, a roller equidistantly mounted on each side of the center of the transverse frame, and chain means around and connected to each roller and extending over one of the lower pair of spaced rollers on the elongated member and connected to the slider.

4. A projector comprising a base, an upstanding column supported on said base, a table supported at substantially right angles to the column, first and second sleeves movably mounted above the table, the first being mounted above the second, an arm mounted on the first sleeve, projector means mounted on the arm, frame means mounted transversely of the column and on the second sleeve, an arm extending from the extended frame, lens means carried by the arm, drive means mounted on the extended frame, means for driving the drive means, an elongated member floatingly mounted parallel to the column, upper and lower pairs of spaced rollers mounted on the member, a slider mounted on the member for longitudinal movement thereof, a support rod connected at one end to the arm on the first sleeve and at the other end to the slider, said rod being disposed parallel to the column, support means on the column above the first and second sleeves, chain means extending from said arm down around each of the upper rollers and connected to said support means, a roller equidistantly mounted on each side of the center of the transverse frame, and chain means around and connected to each roller and extending over one of the lower pair of spaced rollers on the elongated member and connected to the slider.

5. For use with image receiving means, an upstanding column for mounting adjacent to the image receiving means, a projector, means mounting said projector for movement along the column, said projector having a movable lens, a frame, means mounting said frame for movement along the column beneath the projector, means for moving said frame, means carried by the frame and supporting the lens, a floating member, upper and lower sheave means on said floating member, suspension means engaging the upper sheave means and having an end attached to said projector mounting means, means supporting the other end in fixed relation to the column such that the floating member moves longitudinally of the column as the projector mounting means moves, sheaves means mounted on the frame, flexible means engaging the lower sheave means and the sheave means mounted on the frame, one end of the flexible means being connected to the frame sheave means, and means movable parallel to the column and connected to the projector mounting means and the other end of the flexible means.

6. For use with image receiving means, upstanding support means for mounting adjacent to the image receiving means, a projector, means mounting said projector for movement along the column, said projector having a movable lens, a frame, means mounting said frame for movement along the support means beneath the projector, means for moving said frame, means carried by the frame and supporting the lens, a floating member, upper and lower sheave means on said floating member, suspension means engaging the upper sheave means and having an end attached to said projector mounting means, means supporting the other end in fixed relation to the support means such that the floating member moves longitudinally of the column as the projector mounting means moves, sheave means mounted on the frame, flexible means engaging the lower sheave means and the sheave means mounted on the frame, one end of the flexible means being connected to the frame sheave means, the other end being connected in spaced relation to the projector mounting means.

7. The structure of claim 6, the frame moving means comprising elevation means engaging the frame and the floating member for varying the distance therebetween as the position of the frame along the column is varied.

8. Apparatus for solving the lens equation $$\frac{1}{A}+\frac{1}{B}=\frac{1}{f}$$

in which A is the lens-object distance, B, the lens-image distance, and f the lens focal length, comprising a member mounted for movement parallel to the axis of the object, lens, and image, first and second sheave means mounted on the member, frame means mounted for movement parallel to the axis and carrying the lens, first suspension means engaging the first sheave means and connected at one end in fixed relation to the object, and at the other end in fixed relation to the image, third sheave means mounted on the frame means a lateral distance from the second sheave means equal to the focal length, second suspension means attached to and engaged with the third sheave means and engaging the second sheave means, and spacing means attached to the other end of the second suspension means and in fixed relation to the object.

9. The structure of claim 8, the first and second sheave means being mounted in spaced relation parallel to the axis.

JOHN T. PENNINGTON.

References Cited in the file of this patent

UNITED STATES PATENTS

| Number | Name | Date |
|---|---|---|
| 1,651,648 | Gruber | Dec. 6, 1927 |
| 2,418,230 | Jacobson | Apr. 1, 1947 |